United States Patent [19]

Johnston

[11] Patent Number: 4,712,962
[45] Date of Patent: Dec. 15, 1987

[54] ARTICULATED BOOM MECHANISM FOR UNLOADING BULK SOLID MATERIAL FROM A SHIP

[75] Inventor: William H. Johnston, Ville de Mont Royal, Canada

[73] Assignee: The CSL Group Inc., Montreal, Canada

[21] Appl. No.: 861,680

[22] Filed: May 9, 1986

[30] Foreign Application Priority Data

Jun. 14, 1985 [CA] Canada ................................. 484002

[51] Int. Cl.⁴ ..................... B63B 27/22; B65G 37/00
[52] U.S. Cl. .................................. 414/144; 198/535; 198/589
[58] Field of Search ................. 198/589, 535, 536; 414/144, 140, 138, 137, 139

[56] References Cited

U.S. PATENT DOCUMENTS

| 1,942,839 | 1/1934 | Sheal et al. | 414/144 |
| 1,996,488 | 4/1935 | Philips | 198/536 X |
| 3,828,915 | 8/1974 | Cox et al. | 414/139 X |

FOREIGN PATENT DOCUMENTS

942499 5/1956 Fed. Rep. of Germany ...... 198/589
7789 1/1982 Japan .................................. 414/140
8105787 7/1983 Netherlands ....................... 414/139

*Primary Examiner*—Robert J. Spar
*Assistant Examiner*—Janice Krizek
*Attorney, Agent, or Firm*—Beveridge, DeGrandi & Weilacher

[57] ABSTRACT

An articulated boom mechanism is utilized for transporting material between a first position and a selectable second position. The boom mechanism is comprised of two boom members. One boom member has its one end mounted by a universal-type connection to a support base and its other end connected to an articulation member. The other boom member has its one end connected to the articulation member. Bulk solid material entering the one end of one of the boom members is transported on a conveyor belt through that boom member and then on a second conveyor belt through the other of the boom members, and then empties from the other end of the other of the boom members. Bulk solid material is thereby transported by the boom mechanism through a path defined by the selective positioning of the one boom member relative to the support base, and also by the relative orientation between the two boom members.

37 Claims, 8 Drawing Figures

ARTICULATED BOOM MECHANISM FOR UNLOADING BULK SOLID MATERIAL FROM A SHIP

This invention relates to a boom secured to the upper structure of a ship for unloading bulk solid material from the ship, and more particularly, to a boom with an articulated construction.

Ships at present generally utilize a single boom of unitary construction for unloading bulk solid material. Such a boom has its one end pivoted to the deck of the ship with its outer end being free to move through a generally semi-circular path. The elevation of the outer end of the boom may also be adjusted such that an angle of up to fifteen degrees is formed between the boom and the deck of the ship. A conveyor system extends through the boom such that bulk solid material emptied from the hold or holds of the ship onto the one end of the boom is transported along the boom and emptied from the other end of the boom.

The difficulty that has been encountered with the use of a single span boom for unloading bulk solid material from a ship relates to the time and effort required in positioning the ship such that the outer end of the boom achieves a desired position. When extending over the side of the ship, the outer end of the boom describes an arc which varies in its displacement from the ship with its distance along the ship. In some cases the outer end of the boom extends to such a great distance beyond the side of the ship during the unloading operation that a second ship must be interposed between the ship and the material receiving site to stabilize the position of the ship.

The subject invention is an articulate boom mechanism which improves over a single span boom on the bulk solid material unloading operation in at least two significant ways. Firstly, a ship utilizing the articulated boom mechanism can assume a greater variety of docking positions without consideration having to be given to the effect of such docking positions on the material unloading position of the boom. Secondly, once the ship has been docked the outer end of the articulated boom mechanism may be oriented to assume any selected displacement from the ship at any selected distance along the ship. The time taken to initiate reclaiming of the bulk solid material from the ship is significantly reduced, and the sometime requirement for interposing of a second ship for stabilizing the unloading operation is eliminated. A further benefit of the articulated boom mechanism is that it allows bulk solid material to be transferred from one ship to a second ship when the two ships are positioned so as to have abutting sides; with the single span unloading boom such transfers were not generally possible.

Although the foregoing description of the invention has been in terms of a ship-based device, the articulated boom mechanism of the invention could also find application in land-based use. In its broadest form, the articulated boom mechanism comprises a first boom construction one end of which is pivotally mounted to a support base by a universal-type connection. The first boom construction has a first conveyor means extending through it for transporting material from one of its ends to the other of its ends. The articulated boom mechanism also comprises an articulation member one portion of which is pivotally mounted to the other end of the first boom construction. A linkage means maintains the articulation member at a fixed orientation relative to the support base for all angular positions assumed by the first boom construction relative to the support base. The articulated boom mechanism also comprises a second boom construction one end of which is pivotally mounted to another portion of the articulation member. The second boom construction has a second conveyor means extending through it for transporting bulk solid material from one of its ends to the other of its ends. First support means extends between the support base and a first boom member of the first boom construction for selectively varying the relative angle between the first boom member and the support base. A second support means extends between the articulation member and a second boom member of the second boom construction for selectively varying the relative angle between the articulation member and the second boom member. The articulated boom mechanism also comprises a first pivot means for rotating the first boom construction relative to the support base, and further comprises a second pivot means for rotating the other portion of the articulation member and the second boom construction mounted thereto relative to the one portion of the articulation member. Bulk solid material placed onto one of the conveyor means is subsequently discharged from the other conveyor means after moving through a path determined by the first and second support means and the first and second pivot means.

In one form, the invention is an articulated boom mechanism for unloading bulk solid material from a ship, the mechanism comprising first and second boom constructions, an articulation member positioned between and connecting with both boom construction, a linkage means to maintain the articulation member in a certain orientation, and first and second support means and first and second pivot means for positioning the outer end of the articulated boom mechanism. One end of the first boom construction is adapted to be pivotally mounted to the structure of the ship by a universal-type connection, and a first conveyor means is adapted to extend through the first boom construction for transporting bulk solid material from its one end to its other end. One portion of the articulation member is adapted to be pivotally mounted to the other end of the first boom construction. One end of the second boom construction is adapted to be pivotally mounted to another portion of the articulation member, and the second boom construction has a second conveyor means extending through it for transporting bulk solid material from its one end to its other end. The linkage means is adapted to maintain the articulation member at a fixed orientation relative to the structure of the ship for all angular positions assumed by the first boom construction relative to the structure of the ship. The first support means is adapted to extend in use between the structure of the ship and the first boom construction for selectively varying the relative angle therebetween. The second support means is adapted to extend in use between the articulation member and the second boom construction for selectively varying the relative angle therebetween. The first pivot means is adapted to rotate the first boom construction relative to the structure of the ship, and the second pivot means is adapted to rotate the other portion of the articulation means and the second boom construction mounted thereto relative to the one portion of the articulation member. After installation of the articulated boom mechanism on the ship, bulk solid material placed onto the first conveyor means is subsequently discharged from the second conveyor means at a position determined by the first and second support means and the first and second pivot means.

The articulation member may be a tube adapted in use to have its symmetry axis extending generally vertically, the tube in use having an upper portion defining the one portion of the articulation member and a lower portion defining the other portion of the articulation member. The upper and lower portions of the tube are connected by an annular bearing extending therebetween. The other end of the first conveyor means is adapted to extend into the upper portion of the tube and the one end of the second conveyor means is adapted to extend into the lower portion of the tube. In such arrangement, bulk solid material falls from the other end of the one conveyor means through the tube onto the one end of the second conveyor means. A first part of the annular bearing may be formed on the lower edge of the upper portion of the tube with a second part of the annular bearing formed on the upper edge of the lower portion of the tube. In such arrangement, the one of the first and second parts of the annular bearing has first gear teeth extending along its periphery, and the other of the first and second parts of the annular bearing has a series of motors mounted on its periphery with each motor driving a set of gear teeth adapted to engage the first gear teeth.

The articulated boom mechanism may also comprise a chute adapted to be mounted within the articulation member. The chute is adapted to be mounted to the upper portion of the tube and to extend generally centrally through the tube. The upper end of the chute is positioned in use under an outer end of the first conveyor means, that outer end being positioned proximate of the other end of the first boom construction. The lower end of the chute is positioned in use above an inner end of the second conveyor means, that inner end being positioned proximate the one end of the second boom construction. When the articulated boom construction is in use, the chute guides bulk solid material leaving the first conveyor means onto the second conveyor means.

The first boom construction may comprise a first boom member and a shaft means, the shaft means being adapted to be pivotally mounted to the structure of the ship so as to rotate around an axis extending normal to the deck of the ship. In such arrangement, the first boom member is adapted to be pivotally mounted on the shaft means so as to rotate around an axis extending parallel to the deck of the ship. The first boom member may be a tube of circular cross-section. The second boom construction may comprise a second boom member, that second boom member being a tube of rectangular cross-section. In such arrangement, the first pivot means may comprise hydraulic actuator means, rack means and pinion means. A stationary portion of the hydraulic actuator means is adapted to be mounted to the structure of the ship, the pinion means is adapted to extend along the periphery of the shaft means, and the rack means is adapted to connect to a movable portion of the hydraulic actuator means and to engage the pinion means. The first boom member may be a sufficiently greater length than the second boom construction that is in use, in one orientation of the articulated boom mechanism, the second boom construction is capable of extending completely under the first boom member.

The linkage means may comprise a first hydraulic actuator means and a second hydraulic actuator means. The first hydraulic actuator means may be adapted to extend between the structure of the ship and the first boom construction and the second hydraulic actuator means may be adapted to extend between the first boom construction and the articulation member. During use of the articulated boom mechanism, actuation of the first hydraulic actuator means results in a corresponding actuation of the second hydraulic means for maintaining the articulation member at the fixed orientation relative to the structure of the ship. The first and second support means may each be comprised of hydraulic actuator means. The first support means may be the first hydraulic actuator means.

The first end of the first conveyor means may be defined by a roller having a rotational axis adapted to extend generally concentrically with the axis of the pivotal mounting around which the articulation member pivots relative to the first boom construction. The lower end of the chute is adapted to be positioned proximate of the axis of the pivotal mounting around which the second boom construction pivots relative to the articulation member.

The articulated boom mechanism of the subject invention will next be described in terms of a preferred embodiment utilizing the accompanying drawings in which.

Figure 1:
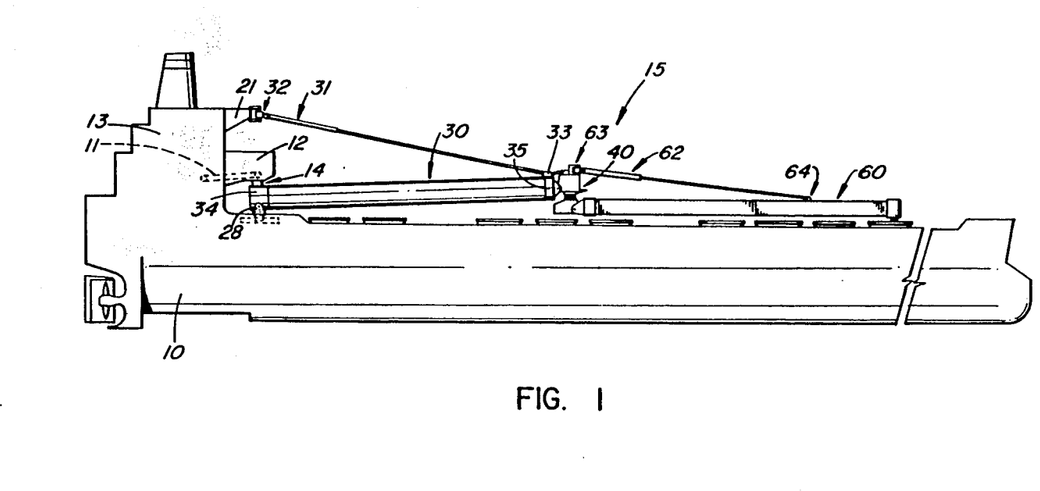
FIG. 1 is a side view of a ship having the preferred embodiment of the articulated boom mechanism extending on its deck.

With reference to FIG. 1, ship 10 has a series of holds extending serially along its length, each hold being capable of holding a portion of a bulk solid material cargo. A series of belts terminating in belt 11, illustrated in outline in FIG. 1, transports bulk solid material from the holds to overhang structure 12, that structure extending forward of the raised superstructure 13 at the rear of ship 10. The bulk solid material is emptied from belt 11 as that belt moves within overhang structure 12 and falls through a flexible cylindrical hood 14 into the base of the articulated boom mechanism that mechanism being generally designated 15.

Figure 2:
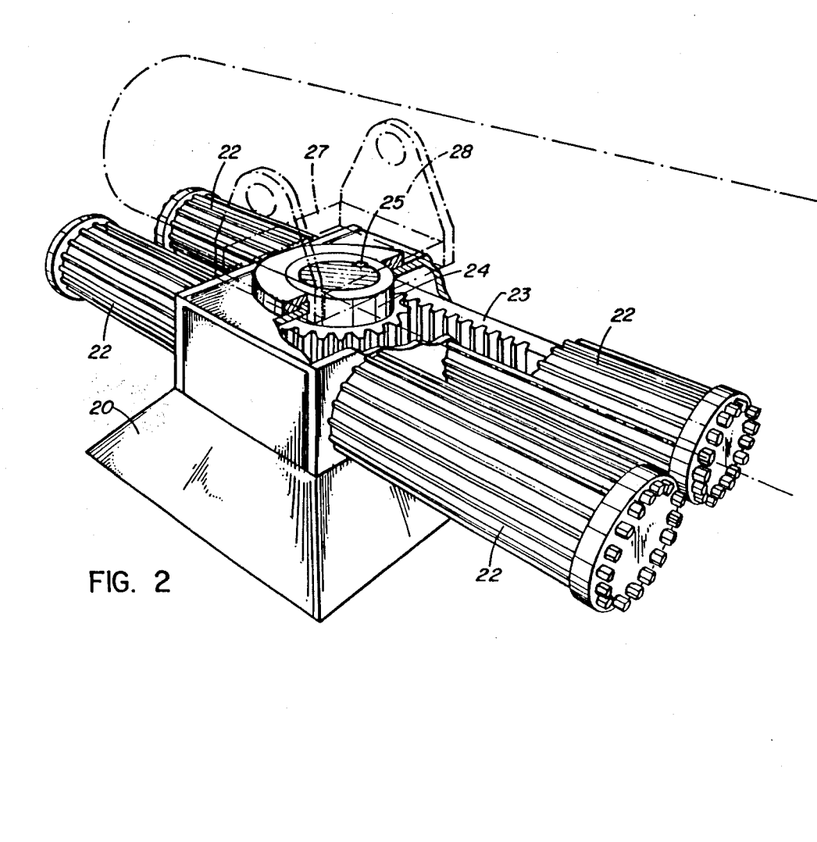
FIG. 2 is a perspective view of that end of the preferred embodiment of the articulated boom mechanism that is mounted to the structure of the ship.
Figure 3:
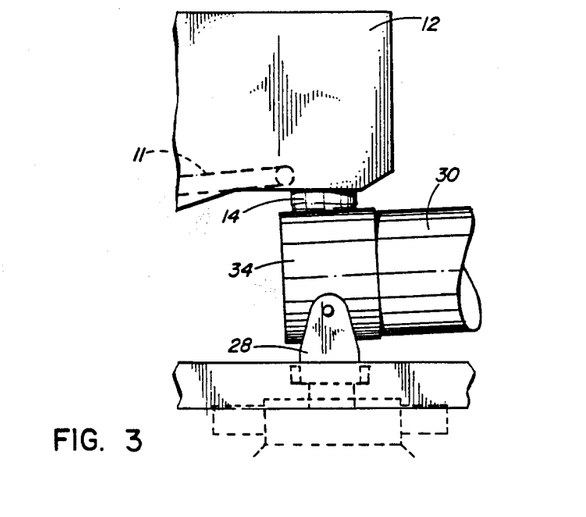
FIG. 3 is a side view of that end of the preferred embodiment of the articulated boom mechanism that is mounted to the structure of the ship, the view also illustrating an overhanging structure through which material is conveyed from the hold or holds of the ship.

Articulated boom mechanism 15 is supported on ship 10 by a base structure 20 mounted on the deck of ship 10 and by an overhang member 21 extending forward of raised superstructure 13 and above overhang structure 12. With reference to FIG. 2, base structure 20 has a sloped lower portion and a generally rectangular upper portion, with a pair of hydraulic piston chambers 22 extending from each of an opposite pair of sides of the rectangular upper portion. Each facing pair of hydraulic piston chambers 22 contains a piston (not shown) connected to an opposite end of a common rack member 23, hydraulic fluid entering one of the facing pair of chambers 22 moving the rack member 23 in one direction while hydraulic fluid is being expelled to a reservoir from the other one of the chambers. The hydraulic fluid is forced simultaneously into a diagonally-opposite pair of the chambers 22 such that the pair of rack members 23 move simultaneously an equal distance but in opposed directions. Centered between the pair of rack members 23 is a pinion member 24 having teeth on its periphery which engage the teeth of the pair of rack members 23. Pinion member 24 is mounted on bearings for free rotation and has a spline groove 25 machined into its inner periphery. A turret member 27 with an integral splined shaft is mounted on pinion member 24 such that its spline sits in spline groove 25. A pair of trunnions 28 are integral with turret member 27 and extend from an opposite pair of sides of turret member 27.

Figure 4:
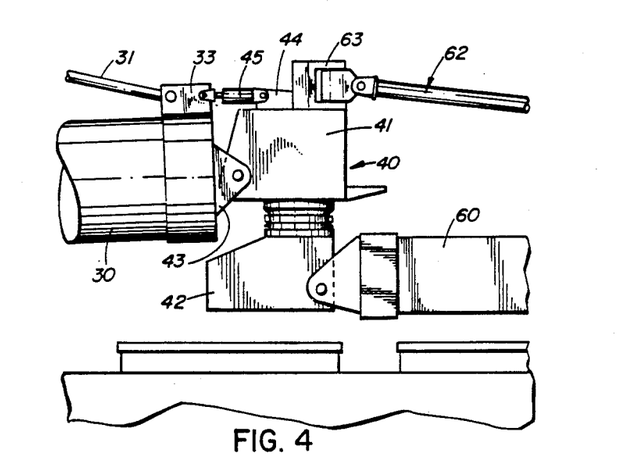
FIG. 4 is a side view of the articulation member of the preferred embodiment of the articulated boom mechanism, the articulation member having first and second boom members pivotally connected to it.

Mounted to rotate in the pair of trunnions 28 is a first boom member 30, its one end being pivotally mounted to the pair of trunnions 28 and its other end being supported through hydraulic actuator mechanism 31 to overhang member 21. The connection between hydraulic actuator mechanism 31 and overhang member 21 is by means of a universal joint 32 such that rotation is possible around an axis normal to the deck of the ship and one parallel to the deck. Axle assembly 32 allows hydraulic actuator mechanism 31 to rotate with first boom member 30. As best shown in FIG. 4, hydraulic actuator mechanism 31 is pivotally connected to the outer end of first boom member 30 by a flange 33 extending from that outer end.

First boom member 30 is a circular tube having a diameter of 10.5 feet. The tube is formed of steel and has 0.375-inch thick walls. Circular reinforcing hoops of rectangular cross-section (not shown) are secured to the outside of the circular tube approximately every 10 feet along the length of the tube; the reinforcing hoops resist torsional stress placed onto first boom member 30. Thick steel bands 34 and 35 are placed over the respective inner and outer ends of the circular tube of first boom member 30 to distribute over the tube the load exerted by the pair of trunnions 28 and hydraulic actuator mechanism 31. In the illustrated preferred embodiment, first boom member 30 is approximately 130 feet in length.

Figure 5:
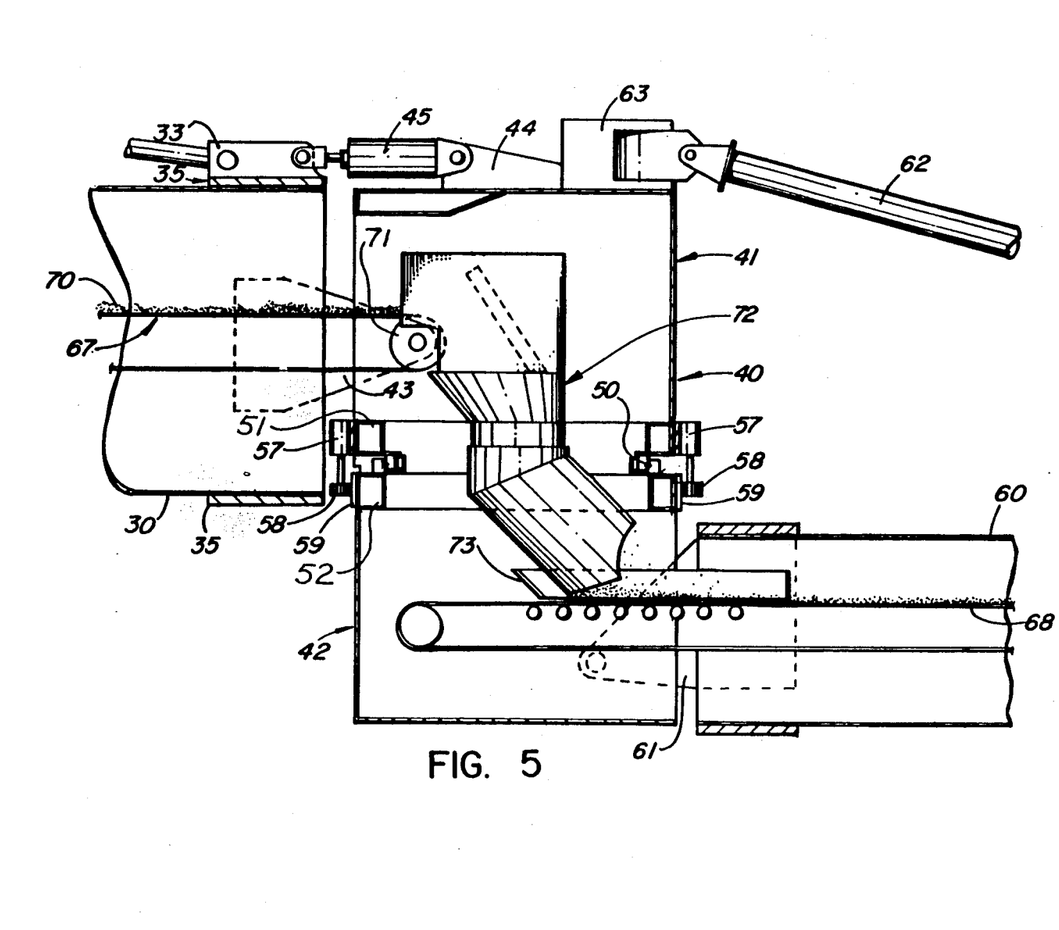
FIG. 5 is a sectional side view of the articulation member and first and second boom members of FIG. 4.

An articulation member 40, as best shown in FIGS. 4 and 5, has an upper portion 41 and a lower portion 42 pivotally connected to upper portion 41. Articulation member 40 is itself pivotally connected to the outer end of first boom member 30 by a pair of trunnions 43. A flange 44 secured to the top of articulation member 40 is connected by hydraulic actuator mechanism 45 to the flange 33 on first boom member 30. Hydraulic actuator mechanisms 31 and 45 have a complementary hydraulic connection such that an extension or contraction of hydraulic actuator mechanism 31 results in a corresponding contraction or expansion of hydraulic actuator mechanism 45, the effect being that articulation member 40 maintains a constant orientation relative to the deck of the ship for all angular positions of first boom member 30; the orientation is one in which the axis of rotation between the upper portion 41 and the lower portion 42 of articulation member 40 extends normal to the deck of the ship.

Figure 6:
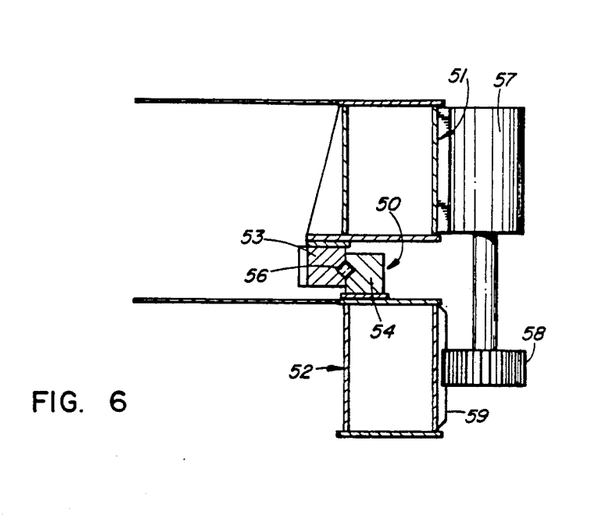
FIG. 6 is an enlarged view of that portion of FIG. 5 relating to the annular bearing that is secured between the upper and lower portions of the articulation member.
Figure 7:
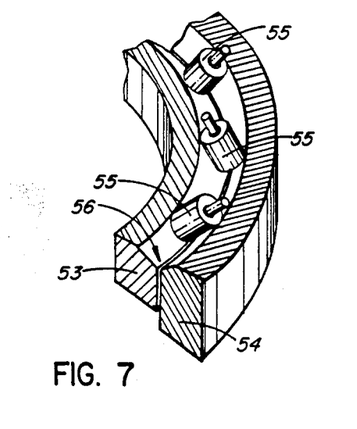
FIG. 7 is a sectional perspective view of the annular bearing that is secured between the upper and lower portions of the articulation member.

Articulation member 40 in plan view is circular in cross-section, the lower portion 42 being rotatable relative to the upper portion 41 by means of an annular bearing generally designated 50. Annular bearing 50 is of the type found on large cranes and is capable of carrying very heavy loading forces while still allowing the two portions of articulation member 40 to rotate relative to each other. FIG. 6 illustrates annular bearing 50 in an enlarged sectioned side view, while FIG. 7 illustrates a perspective sectioned view of the bearing. An upper annular frame 51 of rectangular cross-section and a corresponding lower annular frame 52 are secured to respective upper and lower complementary bearing member 53 and 54, as shown in FIG. 6. A series of rollers 55 each of which has its axis of rotation oriented normal to the axis of rotation of its immediately-adjacent neighbours extends in a diamond-shaped race 56 defined by the facing surfaces of bearing members 53 and 54.

As illustrated in FIGS. 5 and 6, a series of motors 57 are mounted to the periphery of upper annular frame 51. Each motor has a gear wheel 58 secured to its rotor, the series of gear wheels 58 having teeth that engage with complementary teeth on a ring gear 59 that extends around the periphery of lower annular frame 52. The motors 57 are electrically connected such that all are actuated simultaneously; such actuation results in the lower portion 42 of articulation member 40 and a connected second boom member 60 rotating relative to the upper portion 41 of articulation member 40.

The second boom member 60 has its inner end pivotally mounted by a pair of trunnions 61 to the lower portion 42 of articulation member 40, as shown in FIG. 1. Second boom member 60 is of rectangular cross-section and is formed from steel plate 0.375 inches thick. Member 60 of the preferred embodiment is approximately 90 feet long, and is 10.5 feet wide and 6.5 feet high. As with first boom member 30, second boom member 60 has hoops of rectangular cross-section (not shown) secured around its periphery at intervals of approximately 10 feet to assist in resisting torsional stresses. A hydraulic actuator mechanism 62 is connected between a flange 63 extending from articulation member 40 and a flange 64 secured to second boom member 60. Similar to the arrangement with hydraulic actuator mechanism 31, hydraulic actuator mechanism 62 has its one end mounted through a universal joint to flange 63 so as to allow it to rotate with the lower portion 42 of articulation member 40 and with second boom member 60.

A first conveyor belt 67 is mounted to extend centrally through first boom member 30, and a second conveyor belt 68 is mounted to extend centrally through second boom member 60, as illustrated in FIG. 5. One of the two end rollers 71 around which belt 67 extends is mounted so as to have its axis of rotation extending generally concentrically with the pivot axis around which articulation member 60 rotates relative to first boom member 30. This arrangement allows bulk solid material 70 being carried on belt 67 to consistently fall onto the inner surface of a chute 72 secured to the upper portion 41 of articulation member 40. The material 70 is guided by chute 72 and empties onto belt 68 of second boom member 60, guide surfaces 73 secured to member 60 preventing material from falling from the sides of belt 68. The lower lip of chute 72 sits above belt 68 approximately above the axis through which second boom member 60 is pivoted to the lower portion 42 of articulation member 40. That arrangement allows the lower lip of chute 72 to maintain its small spacing from belt 68 over all relative angular orientations between second boom member 60 and articulation member 40.

Figure 8:
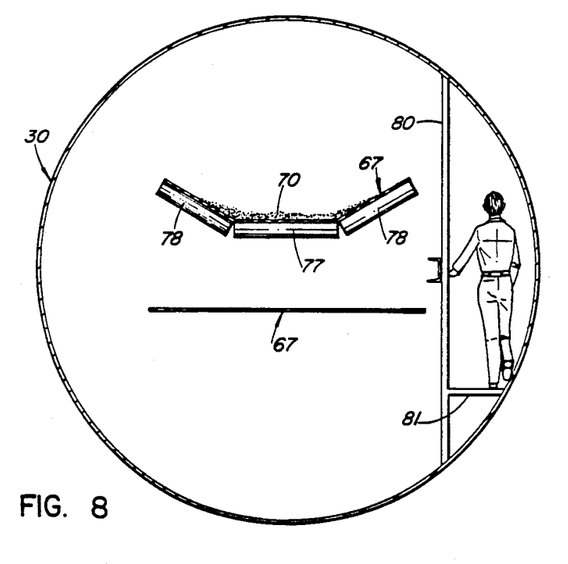
FIG. 8 is a diametrical cross-sectional view of the first boom member of the preferred embodiment of the articulated boom mechanism.

FIG. 8 illustrates a diametrical cross-sectional view of first boom member 30. Belt 67 can be seen to be supported by three rollers, a horizontal central roller 77 and an adjacent pair of inclined side rollers 78. Near either end of first boom member 30, the side rollers 78 assume a horizontal orientation with central roller 77, as illustrated in FIG. 5; a similar situation is true with respect to boom member 60. As seen in FIG. 8, a walkway for personnel is formed by a vertical structural element 80 and a connecting horizontal floor surface 81.

The position of the outer end of second boom member 60, from which bulk solid material leaves the articulated boom mechanism, is positioned by selective actuation of hydraulic actuator mechanisms 31 and 62, selective delivery of hydraulic fluid to a diagonally-opposed pair of chambers 22, and selective actuation of the motors 57. It will be appreciated that the articulated boom mechanism of this invention will allow a ship to be emptied both faster and more easily than is possible with a single span unloading boom.

I claim:

1. An articulated boom mechanism for use in conveying bulk solid material, the boom mechanism comprising:
    (a) a first boom construction, one end of the first boom construction being pivotally mounted to a support base by a universal-type connection, the first boom construction having a first conveyor means with one and another end extending through it for transporting material from one of its ends to another of its ends;
    (b) an articulation member, one portion of which is pivotally mounted to the other end of the first boom construction;
    (c) a second boom construction, one end of the second boom construction being pivotally mounted to another portion of the articulation member, the second boom construction having a second conveyor means with one and another end extending through it for transporting bulk solid material from one of its ends to another of its ends;
    (d) first actuator means extending between the support base and the first boom construction for selectively varying the relative vertical angle between the first boom construction and the support base;
    (e) second actuator means extending between the articulation member and the second boom construction for selectively varying the relative vertical angle between the articulation member and the second boom construction;
    (f) further actuator means for maintaining the articulation member in a substantially fixed orientation relative to the support base for all angular positions assumed by the first boom construction relative to the support base;
    (g) first powered pivot means for rotating the first boom construction relative to the support base through desired horizontal angles; and,
    (h) second powered pivot means for rotating the other portion of the articulation member and the second boom construction mounted thereto relative to the one portion of the articulation member through desired horizontal angles whereby bulk solid material placed onto one of the conveyor means is subsequently discharged from the other conveyor means after moving through a path determined by the first and second actuator means and the first and second pivot means.

2. An articulated boom mechanism as in claim 1, wherein the articulation member includes a hollow body, the body having an upper portion defining the one portion of the articulation member and a lower portion defining the other portion of the articulation member, the upper and lower portions of the body being connected by an annular bearing therebetween, the latter defining an axis of relative rotation between said upper and lower portions, the other end of the first conveyor means extending into the upper portion of the body and one end of the second conveyor means extending into the lower portion of the body, whereby in use bulk solid material moves on the first conveyor means toward the articulation member, falls from the other end of the first conveyor means through the body onto an adjacent end of the second conveyor means, and then moves on the second conveyor means away from the articulation member.

3. An articulated boom mechanism as in claim 1, wherein the first boom construction comprises a first boom member and a shaft means, the shaft means being mounted so as to pivot around a vertical axis on the support base, and the first boom member being pivotally mounted on the shaft means so as to rotate around a horizontal axis.

4. An articulated boom mechanism as in claim 3, wherein the first boom member is a tube of circular cross-section.

5. An articulated boom mechanism as in claim 1, wherein the second boom construction includes a second boom member, the second boom member being a tube of rectangular cross-section.

6. An articulated boom mechanism as in claim 3, wherein the first pivot means comprises hydraulic actuator means, rack means and pinion means, and wherein a stationary portion of the hydraulic actuator means is mounted to the support base, the pinion means extending along the periphery of the shaft means, and the rack means being connected to a movable portion of the hydraulic actuator means for engaging the pinion means.

7. An articulated boom mechanism as in claim 2, wherein a first part of the annular bearing is formed on the lower edge of the upper portion of the body and a second part of the annular bearing is formed on the upper edge of the lower portion of the body, and wherein a one of the first and second parts of the annular bearing has first gear teeth extending along its periphery, and wherein another of the first and second parts of the annular bearing has a series of motors mounted on its periphery, each motor driving a set of gear teeth engaging the first gear teeth.

8. An articulated boom mechanism as in claim 1, wherein the first and the further actuator means comprises a first hydraulic actuator means and a second hydraulic actuator means, respectively, the first hydraulic actuator means extending between the support base and the first boom construction, and the second hydraulic actuator means extending between the first boom construction and the articulation member, actuation of the first hydraulic actuator means resulting in a corresponding actuation of the second hydraulic actuator means for maintaining the articulation member at the fixed orientation relative to the support base.

9. An articulated boom mechanism as in claim 8, wherein the second actuator means comprises a still further hydraulic actuator means.

10. An articulated boom mechanism as in claim 1, wherein the the first and second actuator means are each comprised of hydraulic actuator means.

11. An articulated boom mechanism as in claim 2, and also comprising a chute mounted within the articulation member, the chute being mounted to said upper portion of the body and extending generally centrally through the body, the upper end of the chute being positioned under the other end of the first conveyor means and the lower end of the chute being positioned above the one end of the second conveyor means, the chute guiding bulk solid material leaving the first conveyor means onto the second conveyor means.

12. An articulated boom mechanism for use in unloading bulk solid material from a ship, the boom mechanism comprising:
(a) a first boom construction, one end of the first boom construction being adapted to be pivotally mounted to the structure of the ship by a universal-type connection, the first boom construction havng a first conveyor means with one end and another end extending through it for transporting bulk solid material from its one end to its other end;
(b) an articulation member, one portion of which is adapted to be pivotally mounted to the other end of the first boom construction;
(c) linkage means adapted to maintain the articulation member in use in a substantially fixed or orientation relative to the structure of the ship for all angular positions assumed by the first boom construction relative to the structure of the ship;
(d) a second boom construction, one end of the second boom construction being adapted to be pivotally mounted to another portion of the articulation member, the second boom construction having a second conveyor means with one end and another end extending through it for transporting bulk solid material from its one end to its other end;
(e) first support means adapted to extend in use between the structure of the ship and a first boom member of the first boom construction for selectively varying the relative angle between the first boom member and the deck of the ship;
(f) second support means adapted to extend in use between the articulation member and a second boom member of the second boom construction for selectively varying the relative angle between the articulation member and the second boom member;
(g) first pivot means adapted in use to rotate the first boom construction relative to the structure of the ship; and,
(h) second pivot means adapted in use to rotate the other portion of the articulation member and the second boom construction mounted thereto relative to the one portion of the articulation member; whereby, after installation of the articulated boom mechanism on the ship, bulk solid material placed onto the first conveyor means is subsequently discharged from the second conveyor means at a position determined by the first and second support means and the first and second pivot means.

13. An articulated boom mechanism as in claim 12, wherein the articulation member includes a hollow body having a symmetry axis extending generally vertically when in use, the body in use having an upper portion defining the one portion of the articulation member and a lower portion defining another portion of the articulation member, said upper and lower portions being connected by an annular bearing extending therebetween, the other end of the first conveyor means being adapted to extend into the upper portion of the articulation member and the one end of the second conveyor means being adapted to extend into the lower portion of the articulation member so that bulk solid material falling from the other end of the first conveyor means passes through the articulation member and onto the one end of the second conveyor means.

14. An articulated boom mechanism as in claim 12, wherein the first boom construction includes a shaft means, the shaft means being adapted to be pivotally mounted to the structure of the ship so as to rotate around an axis extending normal to the deck of the ship, and the first boom member being adapted to be pivotally mounted to the shaft means so as to rotate around an axis extending parallel to the deck of the ship.

15. An articulated boom mechanism as in claim 14, wherein the first boom member is a tube of circular cross-section.

16. An articulated boom mechanism as in claim 12, wherein said second boom member is a tube of rectangular cross-section.

17. An articulated boom mechanism as in claim 14, wherein the first pivot means comprises hydraulic actuator means, rack means and pinion means, and wherein a stationary portion of the hydraulic actuator means is adapted to be mounted to the structure of the ship, the pinion means is adapted to extend along the periphery of the shaft means, and the rack means is adapted to connect to a movable portion of the hydraulic actuator means and to engage the pinion means.

18. An articulated boom mechanism as in claim 13, wherein in use a first part of the annular bearing is formed on the lower edge of the upper portion of the articulation member and a second part of the annular bearing is formed on an upper edge of the lower portion of the articulation member, and wherein the one of the first and second parts of the annular bearing has first gear teeth extending along its periphery, and wherein the other of the first and second parts of the annular bearing has a series of motors mounted on its periphery, each motor driving a set of gear teeth adapted to engage the first gear teeth.

19. An articulated boom mechanism as in claim 12, wherein the linkage means comprises a first hydraulic actuator means and a second hydraulic actuator means, the first hydraulic actuator means being adapted to extend between the structure of the ship and the first boom construction, and the second hydraulic actuator means being adapted to extend between the first boom construction and the articulation member, actuation in use of the first hydraulic actuator means resulting in a corresponding actuation of the second hydraulic means for maintaining the articulation member at the fixed orientation relative to the structure of the ship.

20. An articulated boom mechanism as in claim 19, wherein the first support means is the first hydraulic actuator means.

21. An articulated boom mechanism as in claim 12, wherein the first and second support means are each comprised of hydraulic actuator means.

22. An articulated boom mechanism as in claim 13, and also comprising a chute adapted to be mounted within the articulation member, the chute being adapted to be mounted to the upper portion of the hollow body and to extend generally centrally through the latter, the upper end of the chute being positioned in use under an outer end of the first conveyor means, that outer end being positioned proximate of the other end of the first boom construction, and the lower end of the chute being positioned in use above an inner end of the second conveyor means, that inner end being positioned proximate of the one end of the second boom construction, the chute guiding bulk solid material leaving the first conveyor means onto the second conveyor means.

23. An articulated boom mechanism as in claim 22, wherein the outer end of the first conveyor means is defined by a roller having a rotational axis adapted to extend generally concentrically with an axis of a pivotal mounting around which the artculation member pivots relative to the first boom construction, and wherein the lower end of the chute is adapted to be positioned proximate of an axis of a pivotal mounting around which the second boom construction pivots relative to the articulation member.

24. An articulated boom mechanism for use in unloading bulk solid material from a ship, the boom mechanism comprising:
(a) a support shaft mechanism adapted to be mounted to the structure of the ship for rotation around a first axis, that first axis extending normal to the deck of the ship;
(b) a first boom member adapted to have its one end pivotally mounted to the support shaft mechanism such that the first boom member rotates on its one end around a second axis relative to the support shaft mechanism, the second axis remaining normal to the first axis for all positions of the first boom member;
(c) a first conveyor means adapted to extend in use lengthwise through the first boom member such that its one end is proximate of the one end of the first boom member and its other end is proximate another end of the first boom member;
(d) an articulation member, one portion of which is adapted to be pivotally mounted to the other end of the first boom member, the articulation member pivoting relative to the first boom member around an axis extending parallel to the second axis;
(e) a linkage mechanism adapted to extend in use between the body of the ship and the first boom member and between the first boom member and the articulation member, the linkage mechanism maintaining the angle between the articulation member and the deck of the ship fixed for all angular positions assumed by the first boom member relative to the deck of the ship;
(f) a second boom member adapted to have its one end pivotally mounted to the articulation member such that the second boom member rotates on its one end around a third axis relative to the articulation member, the third axis remaining normal to the first axis for all positions of the second boom member, the second boom member being mounted to a portion of the articulation member different from that portion mounted to the first boom member, (g) a second conveyor means adapted to extend in use lengthwise through the second boom member such that the one end of the second conveyor means is proximate of the one end of the second boom member and the other end of the second conveyor means is proximate another end of the second boom member, the one end of the second conveyor means having a position generally below the other end of the first conveyor means such that bulk solid material leaving the first conveyor means falls onto the second conveyor means;
(h) a first support mechanism adapted to extend in use between the structure of the ship and the first boom member for selectively varying the angle between the support shaft mechanism and the first boom member around the second axis;
(i) a second support mechanism adapted to extend in use between the articulation member and the second boom member for selectively varying the angle therebetween around the third axis;
(j) a first pivot mechanism adapted to rotate the support shaft mechanism around the first axis; and,
(k) a second pivot mechanism adapted to rotate the two portions of the articulation member relative to each other around an axis extending parallel to the first axis; whereby, after installation of the articulated boom mechanism on the ship, bulk solid material deposited on the one end of the first conveyor means falls from the other end of the first conveyor means onto the one end of the second conveyor means and subsequently falls from the other end of the second conveyor means at a location defined by the first and second support means and the first and second pivot mechanisms.

25. An articulated boom mechanism for unloading bulk solid material from a ship, the boom mechanism comprising:
(a) a first boom construction, one end of the first boom construction adapted to be pivotally mounted to the structure of the ship by a universal-type connection, the first boom construction having a first conveyor means with one end and another end extending through it for transporting bulk solid material from its one end to its other end;
(b) an articulation member, one portion of which is pivotally mounted to the other end of the first boom construction;
(c) a second boom construction, one end of the second boom construction being pivotally mounted to another portion of the articulation member, the second boom construction having a second conveyor means with one end and another end extending through it for transporting bulk solid material from its one end to its other end;
(d) first actuator means adapted to be connected between the structure of the ship and the first boom construction for selectively varying the relative vertical angle between the first boom construction and the deck of the ship;
(e) further actuator means cooperable with the first actuator means to maintain the articulation member in a substantially fixed orientation when in use relative to the structure of the ship for all angular positions assumed by the first boom construction relative to the structure of the ship;
(f) second actuator means extending between the articulation member and the second boom construction for selectively varying the relative vertical angle between the articulation member and the second boom construction;

(g) first powered pivot means for rotating the first boom construction through a desired horizontal angle relative to the structure of the ship; and, (h) second powered pivot means for rotating the other portion of the articulation member and the second boom construction mounted thereto through a desired horizontal angle relative to the one portion of the articulation member; whereby, bulk solid material placed onto the first conveyor means is subsequently discharged from the second conveyor means at a position determined by the first and second actuator means and the first and second powered pivot means.

26. An articulated boom mechanism as in claim 25, wherein the articulation member has a symmetry axis extending generally vertically when in use, the articulation member having an upper portion defining the one portion of the articulation member and a lower portion defining the other portion of the articulation member, the upper and lower portions of the articulation member being connected by an annular bearing extending therebetween, the other end of the first conveyor means extending into said upper portion and the one end of the second conveyor means extending into said lower portion, bulk solid material falling from the other end of the one conveyor means through the articulation member onto the one end of the second conveyor means.

27. An articulated boom mechanism as in claim 25, wherein the first boom construction comprises a first boom member and a shaft means, the shaft means being pivotally mounted to the structure of the ship so as to rotate around an axis extending normal to the deck of the ship, and the first boom member being pivotally mounted on the shaft means so as to rotate around an axis extending parallel to the deck of the ship.

28. An articulated boom mechanism as in claim 27, wherein the first boom member is a tube of circular cross-section.

29. An articulated boom mechanism as in claim 25, wherein the second boom construction comprises a second boom member, that second boom member being a tube of rectangular cross-section.

30. An articulated boom mechanism as in claim 27, wherein the first powered pivot means comprises hydraulic actuator means, rack means and pinion means, and wherein a stationary portion of the hydraulic actuator means is adapted to be mounted to the structure of the ship, the pinion means extends along the periphery of the shaft means, and the rack means is connected to a movable portion of the hydraulic actuator means for engaging the pinion means.

31. An articulated boom mechanism as in claim 26, wherein a first part of the annular bearing is formed on the lower edge of the upper portion of the articulation member and a second part of the annular bearing is formed on the upper edge of the lower portion of the articulation member, and wherein the one of the first and second parts of the annular bearing has first gear teeth extending along its periphery, and wherein the other of the first and second parts of the annular bearing has a series of motors mounted on its periphery, each motor driving a set of gear teeth engaging the first gear teeth.

32. An articulated boom mechanism as in claim 25, wherein the first and the further actuator means comprises a first hydraulic actuator means and a further hydraulic actuator means respectively; the first hydraulic actuator means, in use, extending between the structure of the ship and the first boom construction, and the further hydraulic actuator means extending between the first boom construction and the articulation member, actuation of the first hydraulic actuator means resulting in a corresponding actuation of the further hydraulic means for maintaining the articulation member at the fixed orientation relative to the structure of the ship.

33. An articulated boom mechanism as in claim 32, wherein the second actuator means includes a second hydraulic actuator means.

34. An articulated boom mechanism as in claim 32, wherein the first and second actuator means are each comprised of hydraulic actuator means.

35. An articulated boom mechanism as in claim 26, and also comprising a chute mounted within the articulation member, the chute being mounted to the upper portion of the articulation member and extending generally centrally through the latter, the upper end of the chute being positioned in use under an outer end of the first conveyor means, that outer end being positioned proximate of the other end of the first boom construction, and the lower end of the chute being positioned in use above the one end of the second conveyor means, that one end being positioned proximate the one end of the second boom construction, the chute guiding bulk solid material leaving the first conveyor means onto the second conveyor means.

36. An articulated boom mechanism as in claim 35, wherein the other end of the first conveyor means is defined by a roller having a rotational axis extending generally concentrically with an axis of a pivotal mounting around which the articulation member pivots relative to the first boom construction, and wherein the lower end of the chute is positioned proximate an axis of a pivotal mounting around which the second boom construction pivots relative to the articulation member.

37. The combination with a ship of an articulated boom mechanism for unloading bulk solid material from the ship, the boom mechanism comprising;

(a) a support shaft mechanism mounted to the structure of the ship for rotation around a first axis, said first axis extending normal to the deck of the ship;

(b) a first boom member having its one end pivotally mounted to the support shaft mechanism such that the first boom member rotates, in use, on its one end around both said first axis and a second axis relative to the support shaft mechanism, the second axis remaining normal to the first axis for all positions of the first boom member;

(c) a first conveyor means extending lengthwise through the first boom member such that its one end is proximate the one end of the first boom member and its other end is proximate another end of the first boom member;

(d) an articulation member pivotally mounted to the other end of the first boom member, the articulation member pivoting relative to the first boom member around a third axis extending parallel to the second axis;

(e) a second boom member having its one end pivotally mounted to the articulation member such that the second boom member rotates on its one end around a fourth axis relative to the articulation member, the fourth axis remaining normal to the first axis for all positions of the second boom member, the second boom member being mounted to a portion of the articulation member different from that portion of the articulation member mounted to the first boom member, and the two portions of the articulation member being rotatable relative to each other around a fifth axis which is normal to said third and fourth axes;

(f) a second conveyor means extending lengthwise through the second boom member such that one end of the second conveyor means is proximate the one end of the second boom member and another end of the second conveyor means is proximate another end of the second boom member, the one end of the second conveyor means having a position generally below the other end of the first conveyor means such that bulk solid material leaving the first conveyor means falls onto the second conveyor means;

(g) a first mechanism extending between the structure of the ship and the first boom member for selectively varying the vertical angle between the deck of the ship and the first boom member around the second axis;

(h) a second mechanism extending between the articulation member and the second boom member for selectively varying the vertical angle therebetween around the fourth axis;

(i) a further mechanism extending between the first boom member and the articulation member for maintaining the fifth axis about which the two portions of the articulation member relatively rotate generally parallel to said first axis for all angular positions assumed by the first boom member relative to the deck of the ship;

(j) a first pivot means for rotating the support shaft mechanism through a horizontal angle around the first axis; and, (k) a second pivot means for rotating the two portions of the articulation member through a horizontal angle relative to each other around the fifth axis; whereby, bulk solid material deposited on the one end of the first conveyor means falls from the other end of the first conveyor means onto the one end of the second conveyor means and subsequently falls from the other end of the second conveyor means at a location defined by the first and second mechanisms and the first and second pivot means.

* * * * *